(12) United States Patent
Nagakita

(10) Patent No.: US 8,179,756 B2
(45) Date of Patent: May 15, 2012

(54) OPTICAL DISC DRIVE APPARATUS, CONTROL METHOD THEREOF AND OPTICAL DISC DRIVE SYSTEM

(75) Inventor: Hiroki Nagakita, Tokyo (JP)

(73) Assignee: Sony Corporation, Tokyo (JP)

( * ) Notice: Subject to any disclaimer, the term of this patent is extended or adjusted under 35 U.S.C. 154(b) by 36 days.

(21) Appl. No.: 12/908,423

(22) Filed: Oct. 20, 2010

(65) Prior Publication Data

US 2011/0122751 A1    May 26, 2011

(30) Foreign Application Priority Data

Nov. 25, 2009   (JP) ................................. 2009-267243

(51) Int. Cl.
*G11B 7/00* (2006.01)
(52) U.S. Cl. ................... 369/47.3; 369/47.2; 369/47.16
(58) Field of Classification Search ................. 369/53.1, 369/53.22, 44.27, 44.28, 47.15, 47.16, 47.2, 369/47.3, 47.19, 47.27, 47.29, 47.46, 47.41, 369/53.37
See application file for complete search history.

(56) References Cited

U.S. PATENT DOCUMENTS 5,761,160 A * 6/1998 Sanada ....................... 369/30.11
7,564,744 B2 * 7/2009 Sato ............................ 369/32.01

FOREIGN PATENT DOCUMENTS

JP    2000-113501    4/2000

* cited by examiner

*Primary Examiner* — Nabil Hindi
(74) *Attorney, Agent, or Firm* — Oblon, Spivak, McClelland, Maier & Neustadt, L.L.P.

(57) ABSTRACT

An optical disc drive apparatus includes: a plurality of optical heads reading out data recorded on an optical disc; and a control section respectively controlling a readout operation and a seek operation for the data of the optical heads. The control section includes a first mode in which when reading out a data group for reproduction of images or audio which are recorded on the optical disc, a readout amount of the data group is allocated to each optical heads and the readout operations of the optical heads are respectively controlled, and a second mode in which when reading out the data group for reproduction of the images or audio which are recorded on the optical disc, the readout operations of the optical heads are respectively controlled so that each optical head reads out the data group. The control section can dynamically switch the first and second modes.

7 Claims, 11 Drawing Sheets

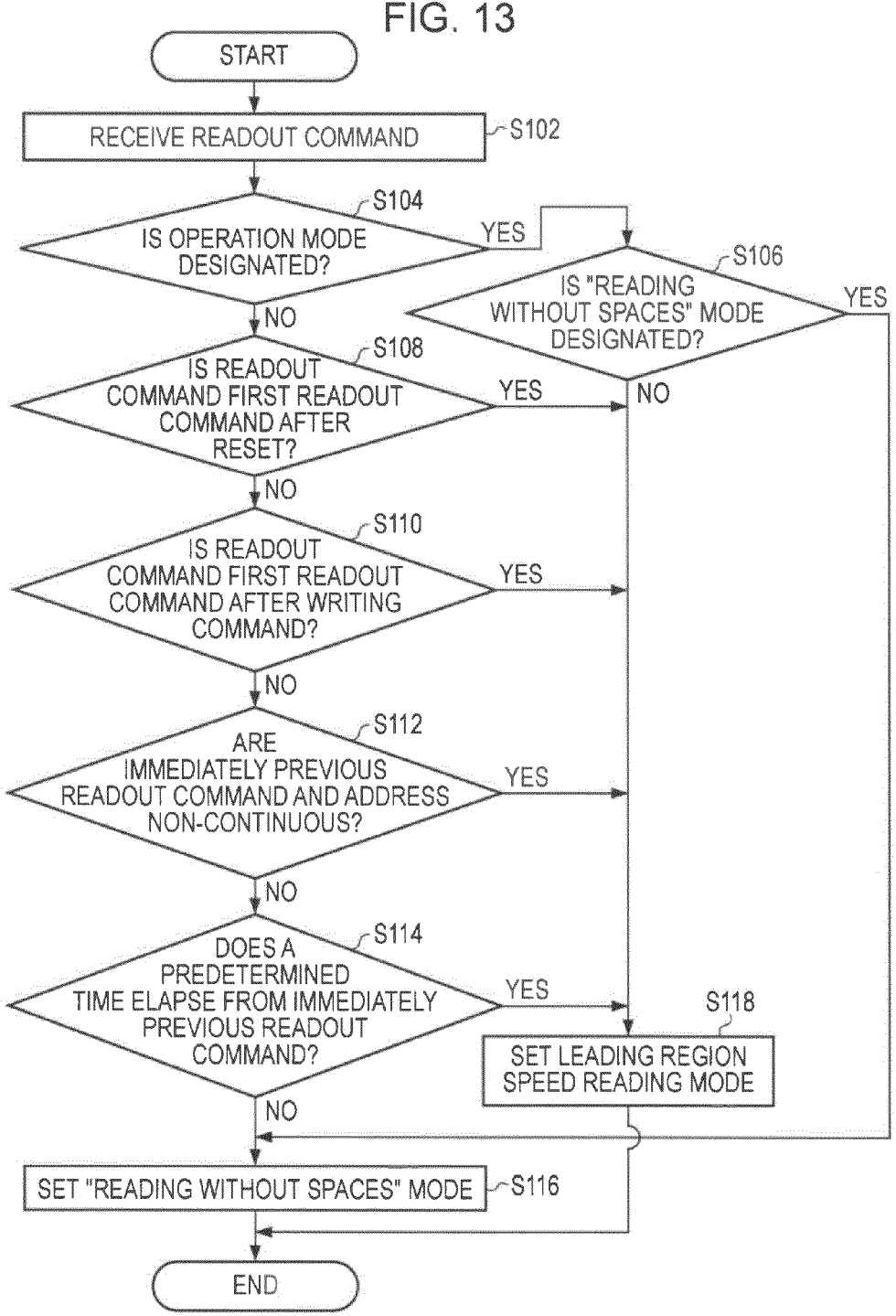

OPTICAL DISC DRIVE APPARATUS, CONTROL METHOD THEREOF AND OPTICAL DISC DRIVE SYSTEM

BACKGROUND OF THE INVENTION

1. Field of the Invention

The present invention relates to an optical disc drive apparatus, a control method thereof and an optical disc drive system.

2. Description of the Related Art

In the related art, CDs (Compact Disc), DVDs (Digital Versatile Disc) and the like are in wide spread use as optical discs which store data in a digital format. Further, an optical disc drive apparatus which record data on such an optical discs and reproduce the data recorded on the optical disc are also being actively developed.

In this respect, there has been proposed a technique capable of efficiently controlling the movement of an optical head according to the size of a file to be read out and securing a high data transmission rate, in an optical disc drive apparatus having a plurality of optical heads (refer to Japanese Unexamined Patent Application Publication No. 2000-113501, for example).

SUMMARY OF THE INVENTION

Here, when the contents of an optical disc which has image data or audio data recorded therein are reproduced, a user may want to reproduce images as quickly as possible, or may want to copy the images onto a separate medium such as an HDD (Hard Disc Drive), or a server at playback speed or faster. In such a case, in an optical disc drive apparatus having a plurality of optical heads, the optimal readout control may be different. Thus, there is a problem in that even though the readout control employed is suitable for one case, the readout control may not achieve sufficient performance in other cases.

Further, in the optical disc drive system, if a host computer which processes image data or audio data does not notify the optical disc drive apparatus having the plurality of optical heads which readout control to be performed is suitable for a certain case among the foregoing cases, the optical disc drive apparatus does not know which case it should perform readout control for. For this reason, the optical disc drive apparatus tends to be generally fixed to a readout control optimized so as to read out the overall data to be read out at a higher speed. However, in this case, there is a problem in that a so-called "audio effect output" performance of images is deteriorated in a case where the images are reproduced as quickly as possible.

Accordingly, it is desirable to provide a novel and improved optical disc drive apparatus, a control method thereof and an optical disc drive system which are capable of appropriately controlling a plurality of optical heads when reading out data recorded on an optical disc.

According to an embodiment of the present invention, there is provided an optical disc drive apparatus including: a plurality of optical heads which reads out data recorded on an optical disc; and a control section which respectively controls a readout operation and a seek operation for the data of the plurality of optical heads, wherein the control section includes a first mode in which when reading out a data group for reproduction of images or audio which are recorded on the optical disc, a readout amount of the data group is allocated to each of the plurality of optical heads and the readout operations of the plurality of optical heads are respectively controlled; and a second mode in which when reading out the data group for reproduction of the images or audio which are recorded on the optical disc, the readout operations of the plurality of optical heads are respectively controlled so that each optical head reads out the data group, and wherein the control section is able to dynamically switch the first mode and the second mode.

The control section may perform control in the first mode when reading out a data group for reproduction of leading images or audio in one file, and may perform control in the second mode when reading out a data group, which is recorded on the optical disc, for reproduction of images or audio subsequent to the leading images or audio in one file.

The control section may allocate the readout amount equally to each of the plurality of optical heads.

The control section may allocate a different readout amount to each of the plurality of optical heads so that the plurality of optical heads terminates the readout at the same time on the basis of information about the current positions of each optical head and information about time taken for the seek operation of each optical head.

The control section may selectively determine an optical head to which the readout amount is allocated among the plurality of optical heads on the basis of information about the current positions of each optical head and information about time taken for the seek operation of each optical head.

According to another embodiment of the present invention, there is provided a control method of an optical disc drive apparatus having a plurality of optical heads which reads out data recorded on an optical disc and a control section which respectively controls a readout operation and a seek operation for the data of the plurality of optical heads. The method includes the steps of: allocating, when reading out a data group for reproduction of leading images or audio in one file which are recorded on the optical disc, a readout amount of the data group to each of the plurality of optical heads, and respectively controlling the readout operations of the plurality of optical heads; and respectively controlling, when reading out a data group, which is recorded on the optical disc, for reproduction of images or audio subsequent to the leading images or audio in one file, the readout operations of the plurality of optical heads so that each optical head reads out the data group.

According to still another embodiment of the present invention, there is provided an optical disc drive system including: an optical disc drive apparatus including a plurality of optical heads which reads out data recorded on an optical disc, and a control section which respectively controls a readout operation and a seek operation for the data of the plurality of optical heads, wherein the control section includes a first mode in which when reading out a data group for reproduction of images or audio which are recorded on the optical disc, a readout amount of the data group is allocated to each of the plurality of optical heads and the readout operations of the plurality of optical heads are respectively controlled, and a second mode in which when reading out the data group for reproduction of the images or audio which are recorded on the optical disc, the readout operations of the plurality of optical heads are respectively controlled so that each optical head reads out the data group, and wherein the control section is able to dynamically switch the first mode and the second mode; and a host computer which issues a readout command to the control section of the optical disc drive apparatus.

According to the above-described embodiments of the present invention, it is possible to appropriately control the plurality of optical heads when reading out the data recorded on the optical disc.

BRIEF DESCRIPTION OF THE DRAWINGS

FIG. 13 is a flowchart illustrating a readout mode setting process performed by an optical disc drive apparatus in FIG. 1.

DESCRIPTION OF THE PREFERRED EMBODIMENTS

Figure 1:
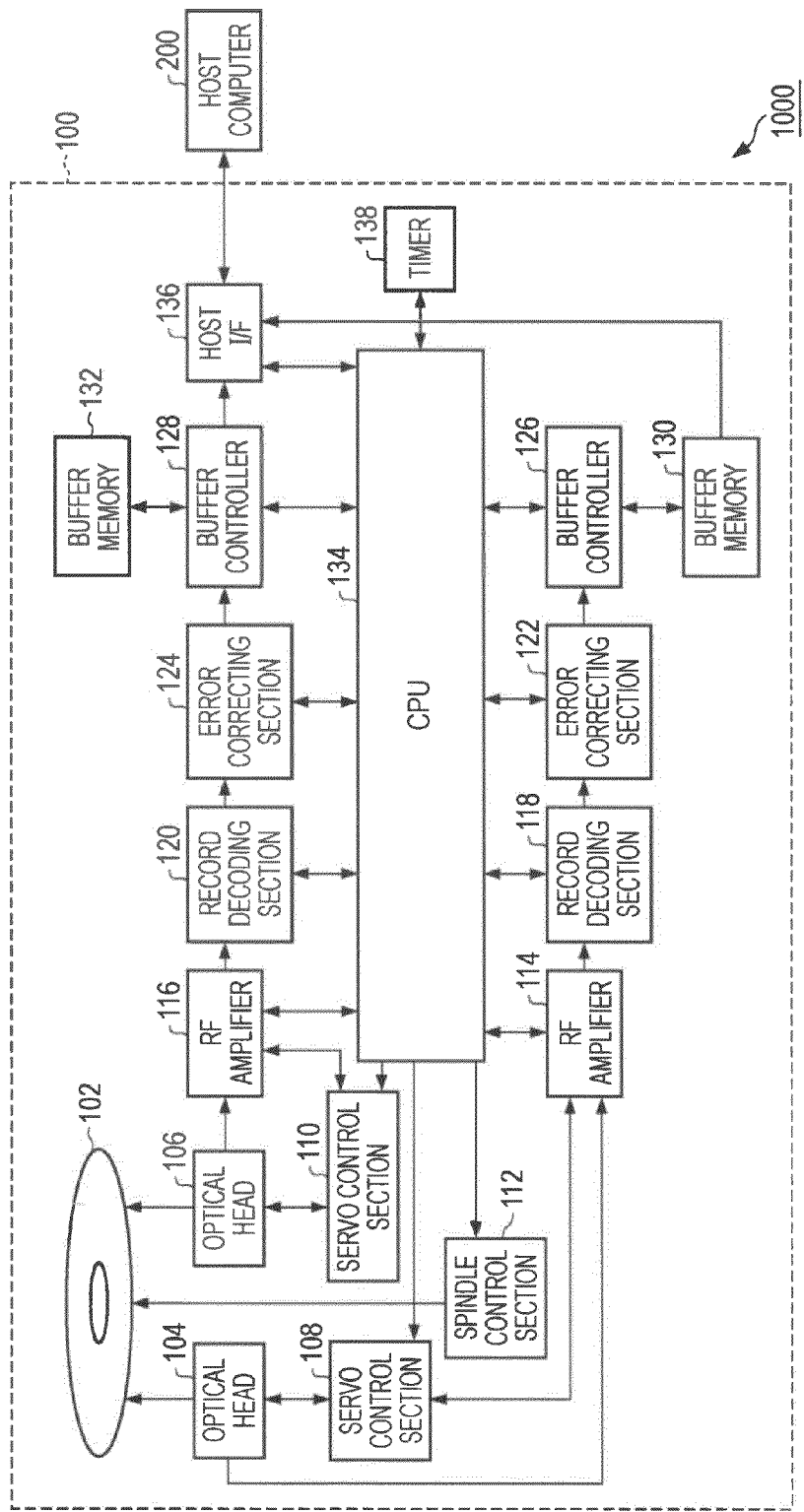
FIG. 1 is a block diagram schematically illustrating a configuration of an optical disc drive system according to an embodiment of the present invention.

Hereinafter, preferred embodiments of the present invention will be described in detail with reference to the accompanying drawings. In the description and drawings, the same reference numerals are given to component elements having substantially the same functional configuration, and repetitive description thereof will be omitted.

The description will be made in the following order:
1. Configuration of optical disc drive system
2. Configuration of optical disc drive apparatus
3. Format of optical disc
4. First optical disc readout control according to a first embodiment of the present invention
5. Second optical disc readout control
6. Third optical disc readout control
7. Optical disc read-ahead control
8. Fourth optical disc readout control
9. Optical disc readout control according to a second embodiment of the present invention
10. Readout mode setting process

[Configuration of Optical Disc Drive System]

Firstly, an optical disc drive system according to an embodiment of the present invention will be described. FIG. 1 is a block diagram schematically illustrating a configuration of the optical disc drive system according to the embodiment of the present invention.

In FIG. 1, an optical disc drive system 1000 includes an optical disc drive apparatus 100 and a host computer 200. The optical disc drive apparatus 100 includes a plurality of optical heads 104 and 106, and performs recording and reproduction of data using light. In FIG. 1, for simplicity of the description, two optical heads are shown. However, for example, in a case where N optical heads are provided, specific processing sections corresponding to the number of the optical heads should be provided for, except processing blocks common to the entire configuration. This embodiment discloses a case where the optical disc drive apparatus 100 is a reproduction apparatus, but a typical optical disc drive system generally uses an optical disc drive apparatus having both recording and reproducing functions. Further, the host computer 200 performs a codec process for images, audio or the like.

[Configuration of Optical Disc Drive Apparatus]

In FIG. 1, the optical disc drive apparatus 100 includes an optical disc 102, the optical heads 104 and 106, servo control sections 108 and 110, a spindle control section 112, RF (Radio Frequency) amplifiers 114 and 116, record decoding sections 118 and 120, error correcting sections 122 and 124, buffer controllers 126 and 128, buffer memories 130 and 132, a CPU 134, a host I/F 136 and a timer 138.

The optical heads 104 and 106 perform photoelectric conversion for light reflected from the optical disc 102 to generate an electric current signal, and then supply the generated electric current signal to the RF amplifiers 114 and 116. The RF amplifiers 114 and 116 generate a focus error signal, a tracking error signal, and a reproduction signal on the basis of the electric current signal from the optical heads 104 and 106, and supply the focus error signal and the tracking error signal to the servo control sections 108 and 110.

The irradiation position of laser light of the optical heads 104 and 106 is controlled to be a predetermined position by a servo signal which is supplied to the optical heads 104 and 106 from the servo control sections 108 and 110. That is, the servo control sections 108 and 110 control a focus servo operation or a tracking servo operation. Specifically, the servo control sections 108 and 110 generate each of a focus servo signal and a tracking servo signal on the basis of the focus error signal and the tracking error signal from the RF amplifiers 114 and 116, and then supply the generated focus servo signal and the tracking servo signal to an actuator (not shown) of the optical heads 104 and 106. Further, the servo control sections 108 and 110 generate a spindle motor driving signal for driving a spindle motor (not shown) to control a spindle servo operation in which the optical disc 102 is rotated at a predetermined rotational speed. Further, the servo control sections 108 and 110 perform a thread control in which a pickup section (not shown) is moved in a diameter direction of the optical disc 102 to change the irradiation position of the laser light.

The RF amplifiers 114 and 116 supply the generated reproduction signal to the record decoding sections 118 and 120. The record decoding sections 118 and 120 generate a reproduction clock using a PLL (Phase Locked Loop) or the like on the basis of the reproduction signal supplied from the RF amplifiers 114 and 116, decode the reproduction signal to generate reproduction data, and restore data including address information, which is recorded on a disc. The recorded and decoded data is transmitted to the error correcting sections 122 and 124.

The error correcting sections 122 and 124 perform an error correction process according to a method of a process used at the time of recording, such as a Reed Solomon iterated code, for example. Further, similarly, a de-interleaving process, a de-scrambling process and the like are also performed according to a predetermined method used at the time of recording. The data, in which the error correction process, the de-interleaving process, the de-scrambling process and the like have been performed, is transmitted to the buffer controllers 126 and 128. The buffer controllers 126 and 128 temporarily store the supplied reproduction data in the buffer memories 130 and 132.

The host I/F 136 transmits and receives commands and data between the host I/F 136 and the host computer 200 which performs processes such as codec of images or audio. Designated data is transmitted to the host computer 200 from among the data stored in the buffer memories 130 and 132, on the basis of a readout command from the host computer 200.

The timer 138 measures a time interval of the readout commands. The timer 138 is reset each time the readout command is received from the host computer 200. If a predetermined time (for example, several seconds) has elapsed, the timer 138 stops counting and outputs a flag signal indicating that the predetermined time has elapsed. Use of the flag will be described later.

The CPU 134 controls the entire optical disc drive apparatus 100 according to instructions programmed in advance. Further, if the CPU 134 receives the readout command from the host computer 200, the CPU 134 performs a readout mode setting process in FIG. 13, which will be described later, and confirms the flag from the timer 138, to thereby set a readout control mode.

[Format of Optical Disc]

Figure 2:
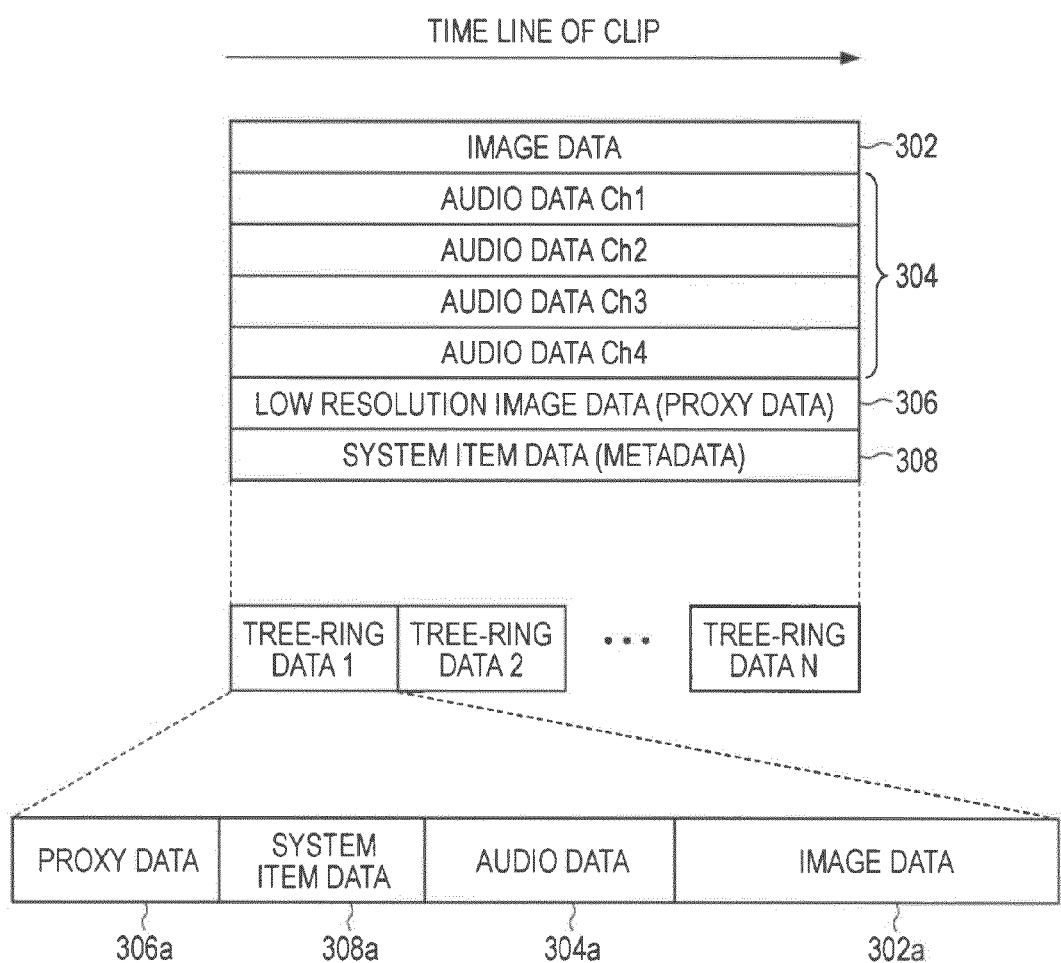
FIG. 2 is a diagram illustrating an example of a format of an optical disc applied to an optical disc drive apparatus according to an embodiment of the present invention.

Next, a format of the optical disc 102 applied to the optical disc drive apparatus 100 according to an embodiment of the present invention will be described. FIG. 2 is a diagram illustrating an example of a format of the optical disc 102 applied to the optical disc drive apparatus 100 according to an embodiment of the present invention. In FIG. 2, one clip is shown in a time line. Further, the optical disc 102 in the embodiment of the present invention has a tree-ring structure.

In FIG. 2, one clip includes files of image data 302 in a clip unit, audio data 304 of a plurality of channels, low resolution image data 306 such as proxy data, and system item data such as metadata.

The image data 302 is image data obtained by compressing and coding baseband image data at a bit rate of about 50 Mbps, for example, using a compression method such as MPEG2 or MPEG4.

The audio data 304 may be audio data still in baseband form, or may be audio data obtained by performing compression such as MPEG. The audio data 304 is referred to as mainline data with respect to the proxy data 306.

The proxy data 306 is data obtained by compressing and multiplexing the baseband image data and audio data with respect to the mainline image data and audio data at a relatively low bit rate of, for example, several Mbps. For the compression coding method, for example, the MPEG4 technique is used, and the proxy data 306 is used as proxy data of the mainline data in order to perform a high speed search reproduction.

The metadata 308 as the system item data is upper level data relating to certain data, and serves as an index for indicating a variety of data contents. The metadata 308 includes real-time metadata generated according to a temporal sequence of the above mainline image data and audio data.

Figure 3:
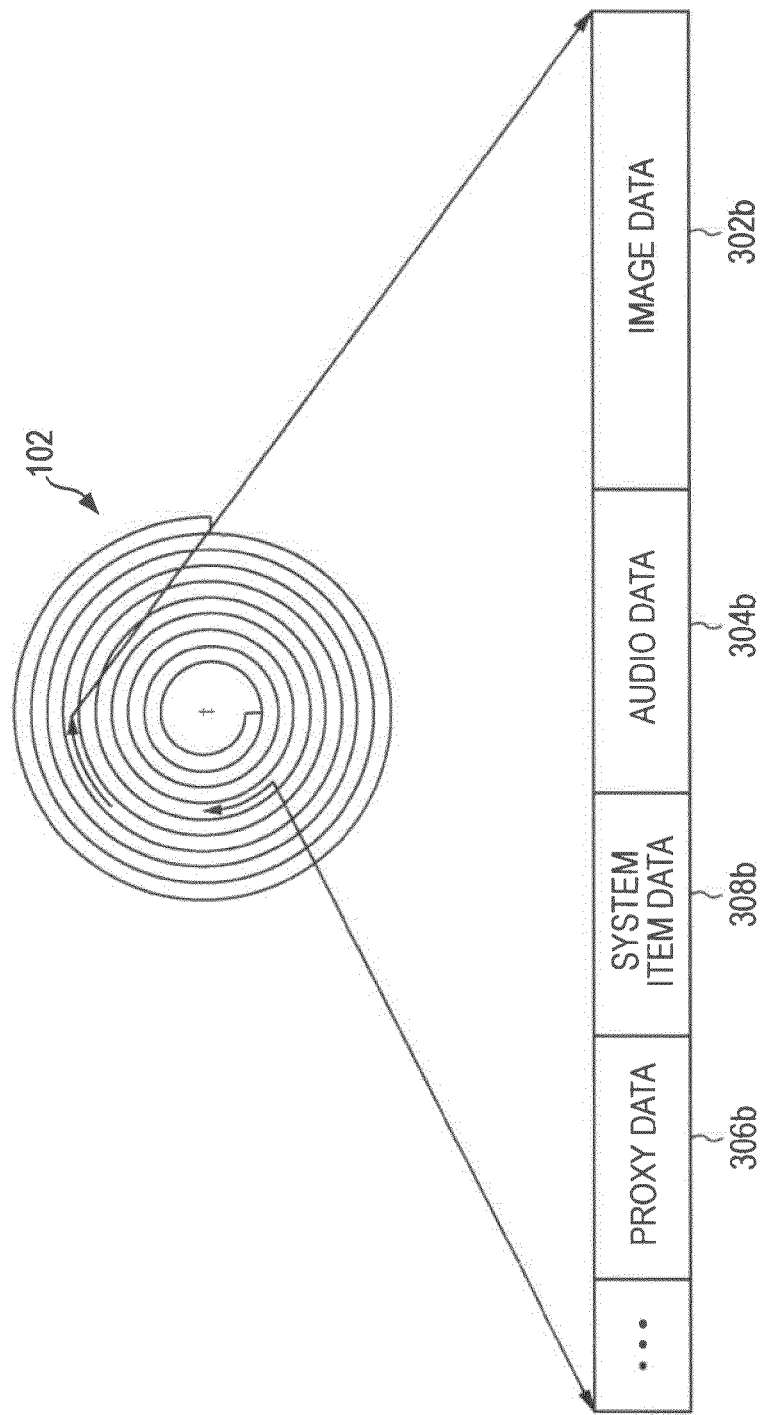
FIG. 3 is a diagram illustrating a piece of tree-ring data formed on an optical disc.

One clip is divided on the basis of a predetermined reproduction time (for example, 2 seconds), and is recorded on the optical disc 102 as a tree-ring structure. As shown in FIG. 3, one tree-ring divides image data 302b, audio data 304b, proxy data 306b, system item data (metadata) 308b, and the like are divided in a predetermined reproduction time unit having a data size of one or more cycles of tracks so that each piece of data corresponds to its reproduction time slot, and then are sequentially arranged and recorded for each reproduction time at which the division is performed. That is, each piece of data for forming the clip is interleaved in a predetermined time unit by the tree-ring structure and is recorded on the optical disc 102.

In the embodiment of the present invention, data for forming the tree-ring is referred to as tree-ring data. The tree-ring data has a data amount of an integer multiple of a minimum recording unit on the optical disc 102. Further, the tree-ring is recorded so that the boundary thereof coincides with a cluster boundary of the recording unit on the optical disc 102.

The size of a tree-ring group is determined according to a format of the image data recorded on the optical disc 102. For example, if the compression rate of the images and audio is constant data (CBR: Constant Bit Rate), the size of the tree-ring group is constant, and is already known in the optical disc drive apparatus 100. However, in a case where the compression rate of the images and audio is not constant (VBR: Variable Bit Rate, ABR: Average Bit Rate), it is necessary for the optical disc drive apparatus 100 to be to notified of this information from the host computer 200 which understands a file system. In a case of a system in which the optical disc drive apparatus 100 is unable to understand the information, a process, for example, where the size assumed as the maximum rate among a variation width of the VBR or ABR is regarded as one tree-ring is performed.

Figure 4:
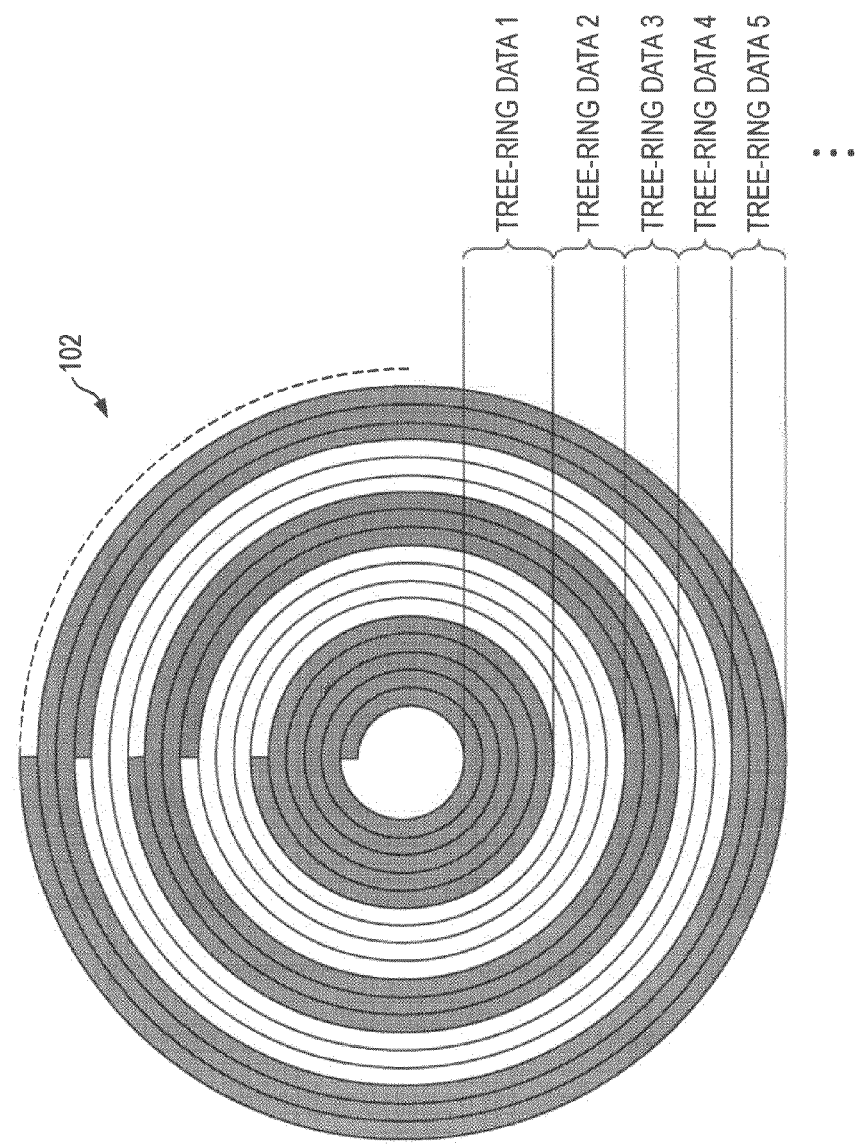
FIG. 4 is a diagram illustrating an example of tree-ring data formed on an optical disc.

FIG. 4 is a diagram illustrating an example of an appearance of the tree-ring data formed for the optical disc 102. In FIG. 4, a tree-ring data 1, a tree-ring data 2, a tree-ring data 3 and so on, which are obtained by dividing one clip into predetermined reproduction time units, are continuously recorded toward the outer circumference from the inner circumference of the optical disc 102. That is, the data is arranged so that a temporal sequence of the reproduction is continued toward the outer circumference from the inner circumference of the optical disc 102.

Figure 5:
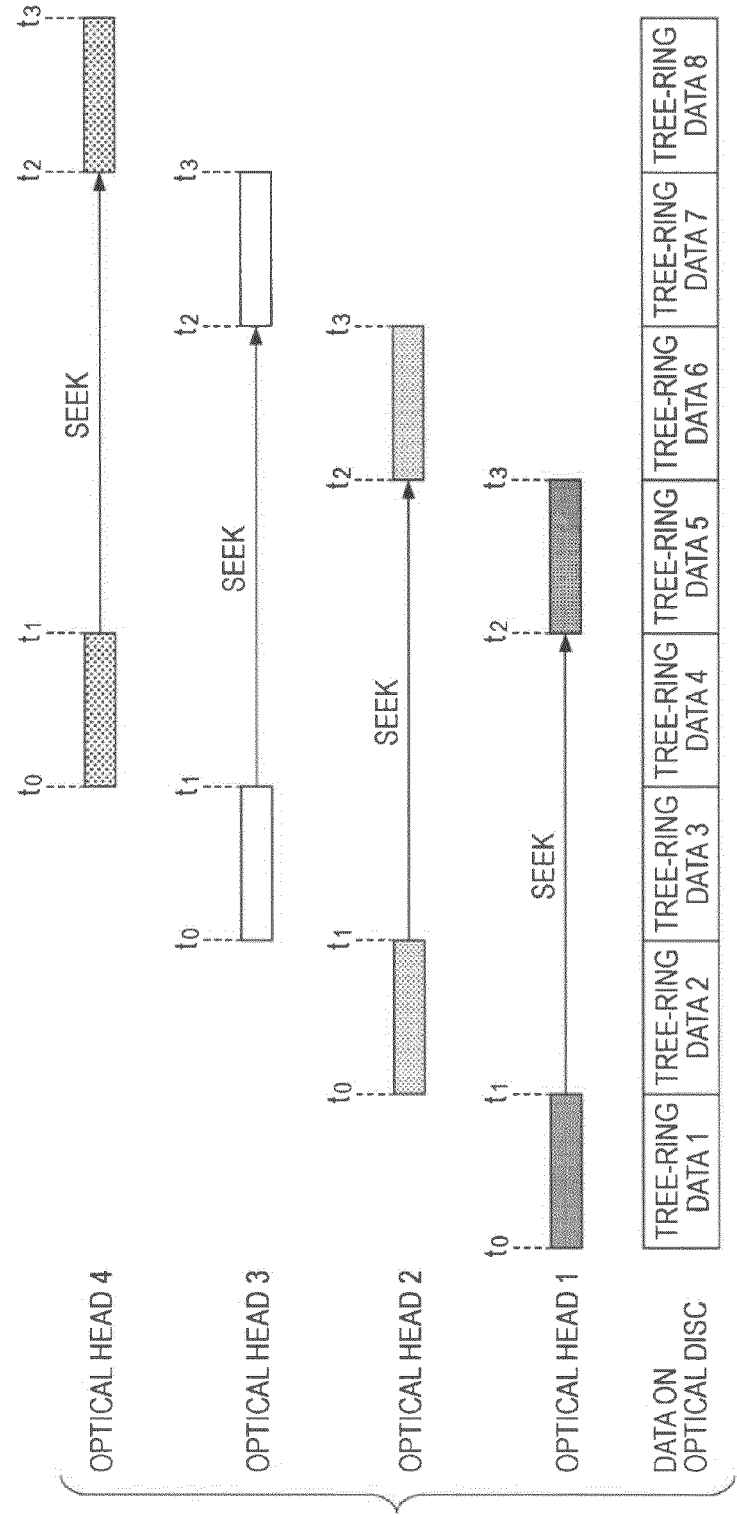
FIG. 5 is a diagram illustrating a first optical disc readout control using a plurality of optical heads, in an optical disc drive apparatus according to a first embodiment of the present invention.

First Optical Disc Readout Control According to a First Embodiment of the Present Invention Next, a first optical disc readout control using a plurality of optical heads in the optical disc drive apparatus according to the first embodiment of the present invention will be described. FIG. 5 is a diagram illustrating the first optical disc readout control using the plurality of optical heads in the optical disc drive apparatus according to the first embodiment of the present invention.

As described above, the image data and the audio data are recorded on the optical disc in the form of a data group called "tree-ring data", and the tree-ring data is read out.

As one tree-ring data which is a data group is read out, for example, it is possible to obtain image data and audio data with a constant throughput of, for example, several seconds or minutes, which is regulated by a system. Thus, by decoding the data group, it is the first time it is possible to obtain the original baseband image data and audio data.

That is, if data does not correspond to one tree-ring, even the leading frame of the image data is not output. Thus, even though one clip or one file is read out from the same optical disc in reproducing the image data, if the leading portion is not read out as quickly as possible, reproduction of the images does not begin. As an example, a case where an optical disc drive apparatus having optical heads corresponding to 4 channels, an optical head 1, an optical head 2, an optical head 3 and an optical head 4, will be described.

In FIG. 5, the optical head 1 starts the readout of the tree-ring data 1 from the leading data position of the tree-ring data 1 at a time t0, and moves to a trailing data position of the tree-ring data 1 at a time t1, to thereby complete the readout of the tree-ring data 1. Further, the optical head 1 performs a seek operation up to the leading data position of the tree-ring data 5, starts the readout the tree-ring data 5 from the leading data position of the tree-ring data 5 at a time t2, and moves to a trailing data position of the tree-ring data 5 at a time t3, to thereby complete the readout of the tree-ring data 5.

The optical head 2 starts the readout of the tree-ring data 2 from the leading data position of the tree-ring data 2 at the time t0, and moves to a trailing data position of the tree-ring data 2 at the time t1, to thereby complete the readout of the tree-ring data 2. Further, the optical head 2 performs a seek operation up to the leading data position of the tree-ring data 6, starts the readout of the tree-ring data 6 from the leading data position of the tree-ring data 6 at the time t2, and moves to a trailing data position of the tree-ring data 6 at the time t3, to thereby complete the readout of the tree-ring data 6.

The optical head 3 starts the readout of the tree-ring data 3 from the leading data position of the tree-ring data 3 at the time t0, and moves to a trailing data position of the tree-ring data 3 at the time t1, to thereby complete the readout of the tree-ring data 3. Further, the optical head 3 performs a seek operation up to the leading data position of the tree-ring data 7, starts the readout of the tree-ring data 7 from the leading data position of the tree-ring data 7 at the time t2, and moves to a trailing data position of the tree-ring data 7 at the time t3, to thereby complete the readout of the tree-ring data 7.

The optical head 4 starts the readout of the tree-ring data 4 from the leading data position of the tree-ring data 4 at the time t0, and moves to a trailing data position of the tree-ring data 4 at the time t1, to thereby complete the readout of the tree-ring data 4. Further, the optical head 4 performs a seek operation up to the leading data position of the tree-ring data 8, starts the readout of the tree-ring data 8 from the leading data position of the tree-ring data 8 at the time t2, and moves to a trailing data position of the tree-ring data 8 at the time t3, to thereby complete the readout of the tree-ring data 8.

In the first readout control shown in FIG. 5, eight pieces of the tree-ring data can be read out between the time t0 and the time t3. In a case where all of the tree-ring data 1 to the tree-ring data 8 is to be read, the eight pieces of tree-ring data is read out in about ¼ of the time it would take compared with a case of having only one optical head. However, since the seek operation is performed between each of the tree-ring data, the necessary time is added, and thus the time is unable to be reduced to ¼ in reality.

Further, while each optical head performs the seek operation up to the readout start position, the reading process of the optical head is stopped. That is, suppressing the number of the seek operations of each optical head to a minimum results in the overall optical disc readout time being minimized.

Figure 6:
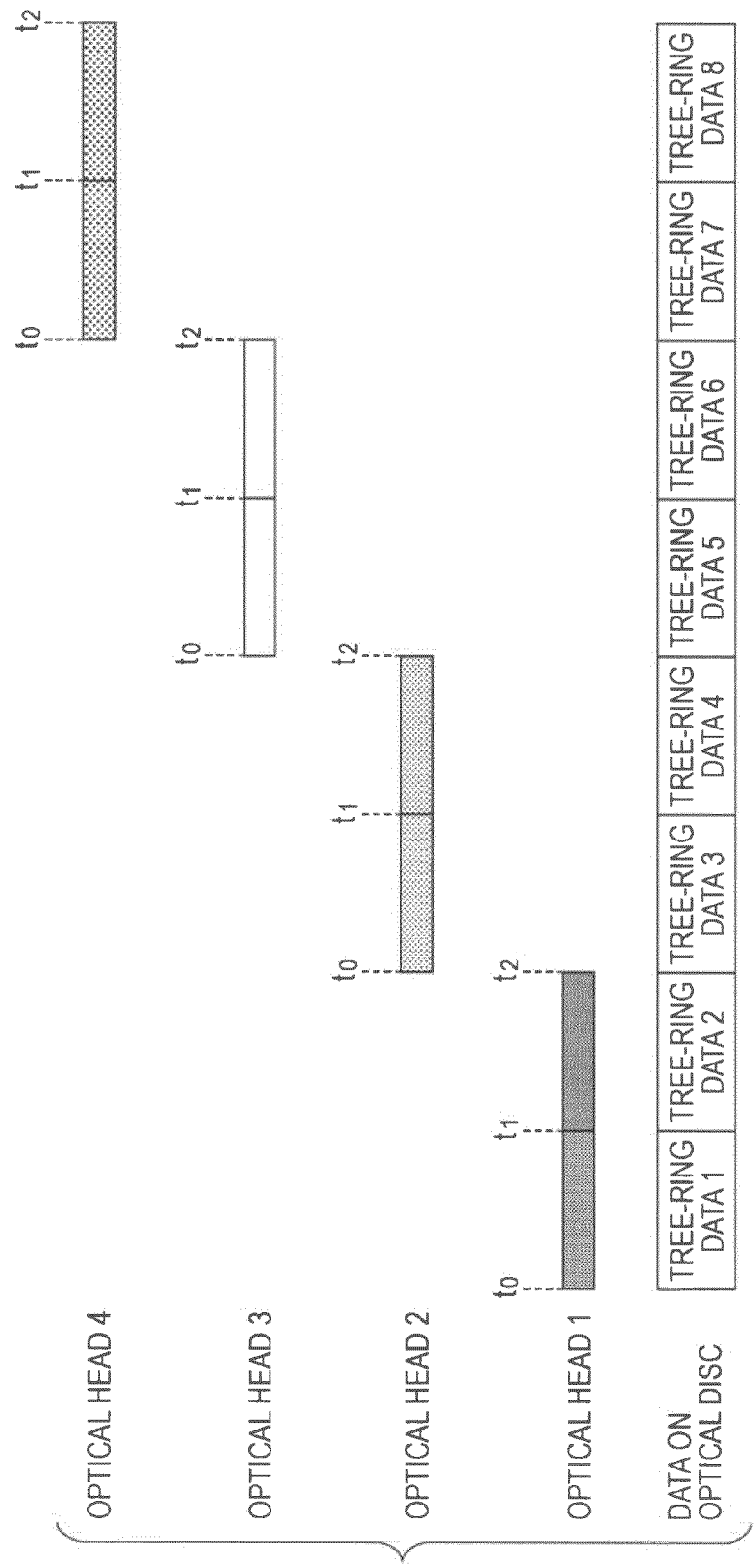
FIG. 6 is a diagram illustrating a second optical disc readout control using a plurality of optical heads, in an optical disc drive apparatus according to a first embodiment of the present invention.

Second Optical Disc Readout Control According to a First Embodiment of the Present Invention FIG. 6 is a diagram illustrating a second optical disc readout control using the plurality of optical heads, in the optical disc drive apparatus according to the first embodiment of the present invention.

In FIG. 6, the optical head 1 starts the readout of the tree-ring data 1 from the leading data position of the tree-ring data 1 at a time t0, and moves to the trailing data position of the tree-ring data 1 at a time t1, to thereby complete the readout of the tree-ring data 1. Further, the optical head 1 starts the readout of the tree-ring data 2 from the leading data position of the tree-ring data 2 at the time t1, and moves to the trailing data position of the tree-ring data 2 at a time t2, to thereby complete the readout of the tree-ring data 2.

The optical head 2 starts the readout of the tree-ring data 3 from the leading data position of the tree-ring data 3 at the time t0, and moves to the trailing data position of the tree-ring data 3 at the time t1, to thereby complete the readout of the tree-ring data 3. Further, the optical head 2 starts the readout of the tree-ring data 4 from the leading data position of the tree-ring data 4 at the time t1, and moves to the trailing data position of the tree-ring data 4 at the time t2, to thereby complete the readout of the tree-ring data 4.

The optical head 3 starts the readout of the tree-ring data 5 from the leading data position of the tree-ring data 5 at the time t0, and moves to the trailing data position of the tree-ring data 5 at the time t1, to thereby complete the readout of the tree-ring data 5. Further, the optical head 3 starts the readout of the tree-ring data 6 from the leading data position of the tree-ring data 6 at the time t1, and moves to the trailing data position of the tree-ring data 6 at the time t2, to thereby complete the readout of the tree-ring data 6.

The optical head 4 starts the readout of the tree-ring data 7 from the leading data position of the tree-ring data 7 at the time t0, and moves to the trailing data position of the tree-ring data 7 at the time t1, to thereby complete the readout of the tree-ring data 7. Further, the optical head 4 starts the readout of the tree-ring data 8 from the leading data position of the tree-ring data 8 at the time t1, and moves to the trailing data position of the tree-ring data 8 at the time t2, to thereby complete the readout of the tree-ring data 8.

In the second readout control shown in FIG. 6, in order to reduce the frequency of the seek operation, the readout of a plurality of pieces of continuous tree-ring data (2 pieces of tree-ring data in FIG. 6) can be allocated to one optical head. As the allocation number becomes increased, the time necessary for the entire readout is close to ¼ time, which is an ideal value, compared with a case of the readout control using one optical head.

On the other hand, when seen from the viewpoint of the time from the start of the readout control to the completion of the readout of the leading "tree-ring data 1", the cases shown in FIGS. 5 and 6 can achieve only the same performance as in the case where only one optical head is used.

Figure 7:
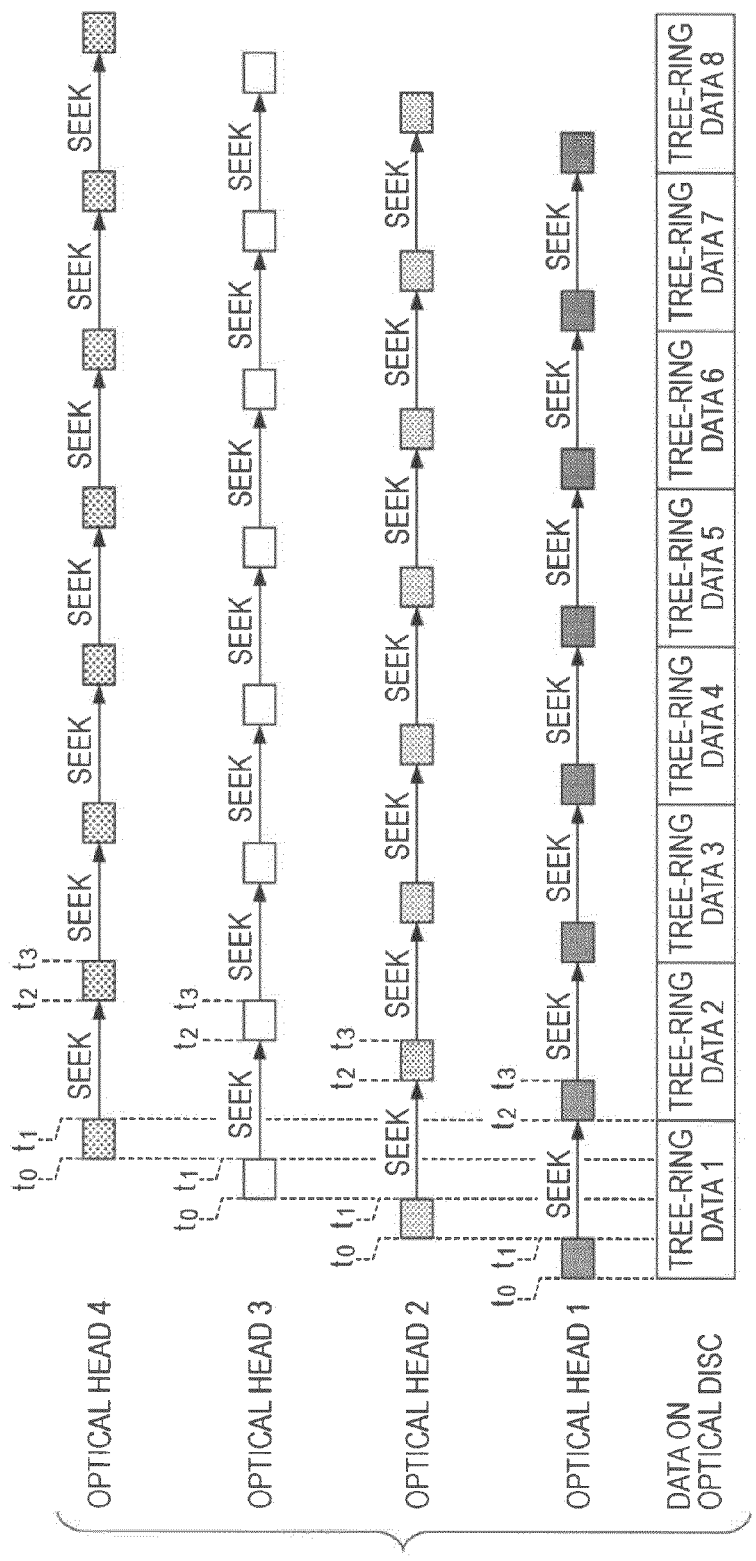
FIG. 7 is a diagram illustrating a third optical disc readout control using a plurality of optical heads, in an optical disc drive apparatus according to a first embodiment of the present invention.

Third Optical Disc Readout Control According to a First Embodiment of the Present Invention FIG. 7 is a diagram illustrating a third optical disc readout control using the plurality of optical heads, in the optical disc drive apparatus according to the first embodiment of the present invention.

In FIG. 7, the optical head 1 starts the readout of the tree-ring data 1 from the leading data position of the tree-ring data 1 at a time t0, and moves to a ¼ data position from the leading data position of the tree-ring data 1 at a time t1, to thereby complete the readout of the data from the leading data position to the ¼ data position of the tree-ring data 1. Further, the optical head 1 performs a seek operation up to the leading data position of the tree-ring data 2, starts the readout of the tree-ring data 2 from the leading data position of the tree-ring data 2 at a time t2, and moves to a ¼ data position from the leading data position of the tree-ring data 2 at a time t3, to thereby complete the readout of ¼ data from the leading data position of the tree-ring data 2. Subsequently, the optical head 1 performs the seek operation and the readout operation for each tree-ring data in a similar manner.

The optical head 2 starts the readout of the tree-ring data 1 from the ¼ data position after the leading data position of the tree-ring data 1 at the time t0, and moves to a ⅔ data position from the leading data position of the tree-ring data 1 at the time t1, to thereby complete the readout of the data from the ¼ data position to the ⅔ data position of the tree-ring data 1. Further, the optical head 2 performs a seek operation up to the ¼ data position from the leading data position of the tree-ring data 2, starts the readout of the tree-ring data 2 from the ¼ data position from the leading data position of the tree-ring data 2 at the time t2, and moves to a ⅔ data position from the leading data position of the tree-ring data 2 at the time t3, to thereby complete the readout of the data from the ¼ data position to the ⅔ data position of the tree-ring data 2. Subsequently, the optical head 2 performs the seek operation and the readout operation for each tree-ring data in a similar manner.

The optical head 3 starts the readout of the tree-ring data 1 from the ⅔ data position after the leading data position of the tree-ring data 1 at the time t0, and moves to a ¾ data position from the leading data position of the tree-ring data 1 at the time t1, to thereby complete the readout of the data from the ⅔ data position to the ¾ data position of the tree-ring data 1. Further, the optical head 3 performs a seek operation up to the ⅔ data position from the leading data position of the tree-ring data 2, starts the readout of the tree-ring data 2 from the ⅔ data position after the leading data position of the tree-ring data 2 at the time t2, and moves to a ¾ data position from the leading data position of the tree-ring data 2 at the time t3, to thereby complete the readout of the data from the ⅔ data position to the ¾ data position of the tree-ring data 2. Subsequently, the optical head 3 performs the seek operation and the readout operation for each tree-ring data in a similar manner.

The optical head 4 starts the readout of the tree-ring data 1 from the ¾ data position after the leading data position of the tree-ring data 1 at the time t0, and moves to the trailing data position of the tree-ring data 1 at the time t1, to thereby complete the readout of the data from the ¾ data position to the trailing data position from the of the tree-ring data 1. Further, the optical head 4 performs a seek operation up to the ¾ data position from the leading data position of the tree-ring data 2, starts the readout of the tree-ring data 2 from the ¾ data position after the leading data position of the tree-ring data 2 at the time t2, and moves to the trailing data position of the tree-ring data 2 at the time t3, to thereby complete the readout of the data from the ¾ data position to the trailing data position of the tree-ring data 2. Subsequently, the optical head 4 performs the seek operation and the readout operation for each tree-ring data in a similar manner.

In the third readout control shown in FIG. 7, with respect to the respective optical heads, one piece of tree-ring data is read out by the four optical heads, to thereby divide its burden. In this case, in a case where all of the data from tree-ring data 1 to the tree-ring data 8 is to be read out, the eight pieces of tree-ring data is read out in about ¼ of the time it would take compared with the case of having only one optical head. However, since the seek operation is performed between each of the tree-ring data, the time for the seek operation is added, and thus the time is unable to be reduced to ¼ in reality. Further, compared with the case shown in FIG. 5 or FIG. 6, since the frequency of the seek operation is increased, deviation from the ¼ time which is the ideal value becomes large.

However, when seen from the viewpoint of the time ranging from the start of the readout control to the completion of the readout of the leading "tree-ring data 1", in the case of FIG. 7, the readout is completed between the time t0 to the time t1, thereby making it possible to perform the readout in about ¼ of the time it would take compared with the case of having only one optical head.

As described above, as the readout control based on the allocation shown in FIG. 5 or FIG. 6 is performed, it is possible to efficiently read out the entire clip (file), and to realize a reduction in the entire optical disc readout time. This can be used for an editing operation while performing disc-to-disc data copying, simple optical disc data copying, uploading to a server, or the like. However, in a case where a user wants to perform image reproduction as quickly as possible, it is not suitable for a so-called image "audio effect output" operation.

On the other hand, as the readout control based on the allocation shown in FIG. 7 is performed, it is possible to read out partial data in the leading portion or the like at a high speed. This is suitable for the so-called image "audio effect output" operation. However, it is not suitable for copying all of a large amount of data.

Accordingly, in the first to the third readout controls using the plurality of optical heads in the optical disc apparatus according to the first embodiment of the present invention, the readout control fixed to either of the operation method shown in FIG. 5 or 6 or the operation shown in FIG. 7 is performed, which makes it difficult to achieve sufficient performance when use is not suitable.

Optical Disc Read-Ahead Control According to the First Embodiment of the Present Invention Next, an optical disc read-ahead control in the optical disc drive apparatus according to the first embodiment of the present invention will be described.

In the optical disc drive apparatus, a readout command issued at one time to the optical disc drive apparatus from the host computer has a small bundle unit called one sector (for example, 2 Kbytes) or one cluster (for example, 64 Kbytes) on an optical disc, smaller than a bundle unit having a certain size called one clip (one file) amount or one tree-ring data amount. Further, as an operation of the optical disc drive apparatus, whenever one command is received, data corresponding to only the amount is read out from the optical disc to be transmitted to the host computer in each case, and thus, the processing speed significantly decreases.

Thus, if the optical disc drive apparatus according to the embodiment of the present invention receives one readout command from the host computer, it is predicted that a readout command for the subsequent region comes next, and a so-called read-ahead operation is performed. What is predicted and the amount and timing of the read-ahead operation significantly affects the performance of the optical disc drive apparatus.

A variety of methods may be considered as a strategy or algorithm of the read-ahead operation. In particular, a read-ahead process in the optical disc drive apparatus having a plurality of optical heads adopts an algorithm for efficiently performing a total one clip (one file) readout, but is not limited thereto.

However, in a system in which the host computer and the optical disc drive apparatus do not work together, since the optical disc drive apparatus does not have information about a specific readout to be performed by the host computer, the size of one clip (one file) to be read out, or the like, first of all, it is often the case that the optical disc drive apparatus performs the readout with an algorithm which efficiently performs total one clip (one file) readout.

Fourth Optical Disc Readout Control According to a First Embodiment of the Present Invention Next, a fourth optical disc readout control using the plurality of optical heads in the optical disc drive apparatus according to the first embodiment of the present invention will be described.

In order to solve problems in the first to third optical disc readout controls using the plurality of optical heads in the foregoing optical disc drive apparatus, the present inventor has found out that it was desirable to realize an optical disc readout control to be described later.

In the optical disc drive apparatus having the plurality of optical heads, when image data using the plurality of optical heads is simultaneously read out, it is important to initially read out leading image data of the images as quickly as possible, and to allocate a short region obtained by dividing one bundle region which is the image data to each optical head, to thereby rapidly reproduce the leading image.

After a certain degree of readout is performed, it is important to read out the data of the entire file as quickly as possible. In order to reduce the number of the seek operations of the optical heads, data division is performed for allocating a certain degree of size to each head.

As the above-described control is performed, a so-called "audio effect output" can be performed in which a head of an image is immediately read out, and so-called "reading without spaces" can be compatibly performed in which one file is continuously read out at a high speed.

Figure 8:
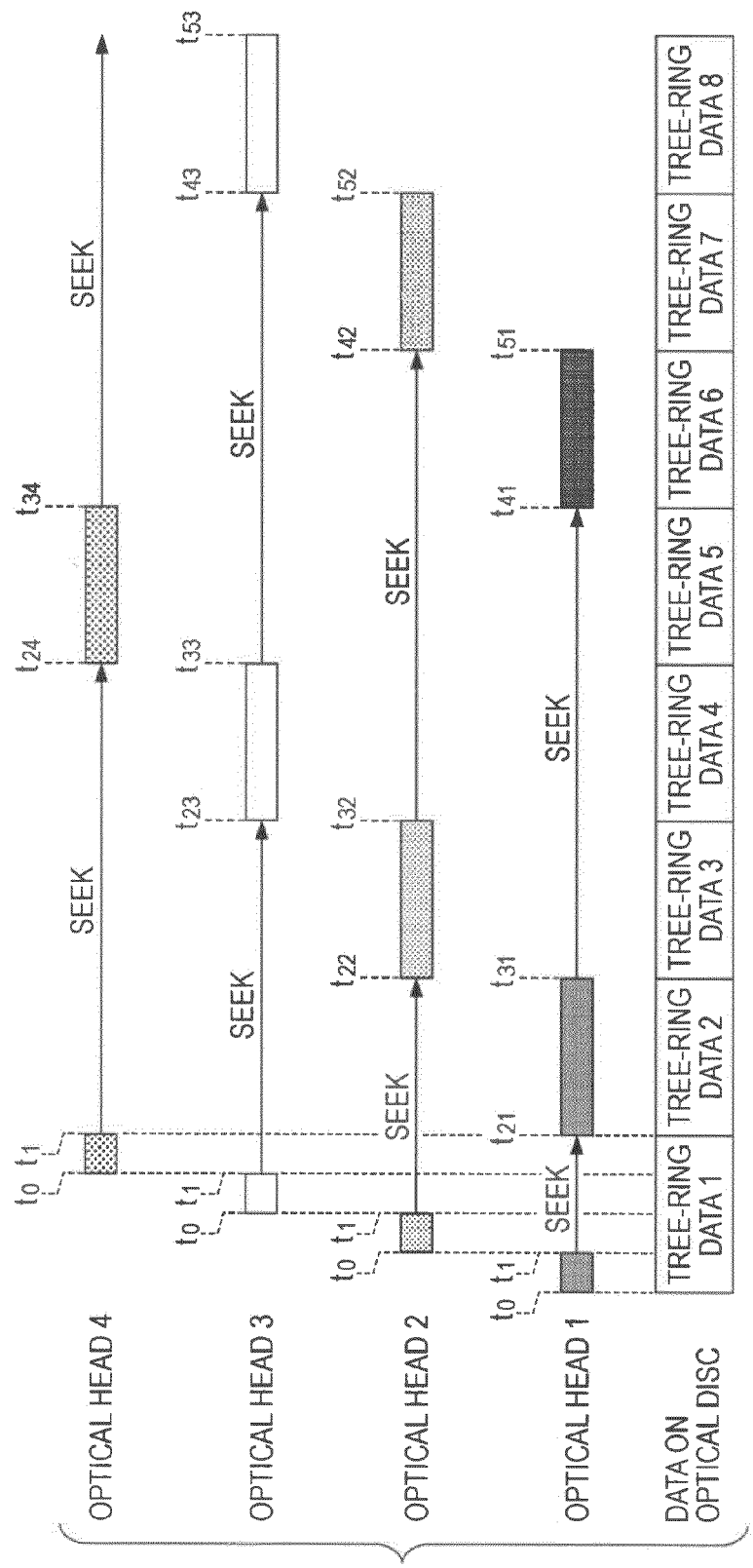
FIG. 8 is a diagram illustrating a fourth optical disc readout control using a plurality of optical heads, in an optical disc drive apparatus according to a first embodiment of the present invention.

FIG. 8 is a diagram illustrating the fourth optical disc readout control using the plurality of optical heads, in the optical disc drive apparatus according to the first embodiment of the present invention will be described.

In FIG. 8, the optical head 1 starts the readout of the tree-ring data 1 from the leading data position of the tree-ring data 1 at a time t0, and moves to a ¼ data position from the leading data position of the tree-ring data 1 at a time t1, to thereby complete the readout of the data from the leading data position to the ¼ data position of the tree-ring data 1. Further, the optical head 1 performs a seek operation up to the leading data position of the tree-ring data 2, starts the readout of the tree-ring data 2 from the leading data position of the tree-ring data 2 at a time t21, and moves to a trailing data position of the tree-ring data 2 at a time t31, to thereby complete the readout of the tree-ring data 2. Subsequently, the optical head 1 performs a seek operation up to the leading data position of the tree-ring data 6, starts the readout of the tree-ring data 6 from the leading data position of the tree-ring data 6 at a time t41, and moves to the trailing data position of the tree-ring data 6 at a time t51, to thereby complete the readout of the tree-ring data 6.

The optical head 2 starts the readout of the tree-ring data 1 from the ¼ data position after the leading data position of the tree-ring data 1 at the time t0, and moves to a ⅔ data position from the leading data position of the tree-ring data 1 at the time t1, to thereby complete the readout of the data from the ¼ data position to the ⅔ data position of the tree-ring data 1. Further, the optical head 2 performs a seek operation up to the leading data position of the tree-ring data 3, starts the readout of the tree-ring data 3 from the leading data position of the tree-ring data 3 at a time t22, and moves to the trailing data position of the tree-ring data 3 at a time t32, to thereby complete the readout of the tree-ring data 3. Subsequently, the optical head 2 performs a seek operation up to the leading data position of the tree-ring data 7, starts the readout of the tree-ring data 7 from the leading data position of the tree-ring data 7 at a time t42, and moves to the trailing data position of the tree-ring data 7 at a time t52, to thereby complete the readout of the tree-ring data 7.

The optical head 3 starts the readout of the tree-ring data 1 from the ⅔ data position after the leading data position of the tree-ring data 1 at the time t0, and moves to the ¾ data position from the leading data position of the tree-ring data 1 at the time t1, to thereby complete the readout of the data from the ⅔ data position to the ¾ data position of the tree-ring data 1. Further, the optical head 3 performs a seek operation up to the leading data position of the tree-ring data 4, starts the readout of the tree-ring data 4 from the leading data position of the tree-ring data 4 at a time t23, and moves to the trailing data position of the tree-ring data 4 at a time t33, to thereby complete the readout of the tree-ring data 4. Subsequently, the optical head 3 performs a seek operation up to the leading data position of the tree-ring data 8, starts the readout of the tree-ring data 8 from the leading data position of the tree-ring data 8 at a time t43, and moves to the trailing data position of the tree-ring data 8 at a time t53, to thereby complete the readout of the tree-ring data 8.

The optical head 4 starts the readout of the tree-ring data 1 from the ¾ data position after the leading data position of the tree-ring data 1 at the time t0, and moves to the trailing data position of the tree-ring data 1 at the time t1, to thereby complete the readout of the data from the ¾ data position to the trailing data position of the tree-ring data 1. Further, the optical head 4 performs a seek operation up to the leading data position of the tree-ring data 5, starts the readout of the tree-ring data 5 from the leading data position of the tree-ring data 5 at a time t24, and moves to the trailing data position of the tree-ring data 5 at a time t34, to thereby complete the readout of the tree-ring data 5. Subsequently, in a case where the readout of a tree-ring data 9 (not shown) is necessary, the optical head 4 performs a seek operation up to the leading data position of the tree-ring data 9, starts the readout of the tree-ring data 9 from the leading data position of the tree-ring data 9 at a time t44, and moves to a trailing data position of the tree-ring data 9 at a time t54, to thereby complete the readout of the tree-ring data 9.

In the fourth readout control shown in FIG. 8, only the leading one tree-ring data (tree-ring data 1) can be read out at a very high speed, and the subsequent tree-ring data can be efficiently read out.

When comparing a case where the size of the allocation to the plurality of optical heads is dynamically switched in this way with a case where the size thereof is fixed to any readout control of "reading without spaces" and the "audio effect output", the relation as shown in table 1 is established.

TABLE 1

| Use Division method | Data copy | Reproduction of image head |
|---|---|---|
| division into large units optimized for reading without spaces (first and second readout controls) | excellent (decrease in readout time) | fair (waiting time until image head appears: long) |
| division into small units optimized for reproduction of image | fair (increase in readout time) | excellent (waiting time until image head appears: |

TABLE 1-continued

| Use Division method | Data copy | Reproduction of image head |
|---|---|---|
| head (third readout control) | | short) |
| division into small units in the beginning, division into large units thereafter (fourth readout control) | good (decrease in readout time) | excellent (waiting time until image head appears: short) |

That is, the "reading without spaces" operation is only not suitable for the leading one tree-ring data, but is optimal in regard to the "audio effect output" operation. Thus, in a case where the optical disc drive apparatus is operated in a state where a specific control method is not given, it is a reasonable control to perform such an operation.

Optical Disc Readout Control According to a Second Embodiment of the Present Invention Next, an optical disc readout control using a plurality of optical heads in an optical disc drive apparatus according to a second embodiment of the present invention will be described.

Here, in transmission reproduction of image data and audio data in a general broadcasting, it is preferable to reduce a time-lag (delay or waiting time) to be as short as possible from an issue of a reproduction instruction so as to correspond to the so-called "audio effect output".

Thus, when the readout instruction is issued from the host computer 200, the optical disc drive apparatus 100 should read out the data at a highest possible speed and transmit the data to the host computer 200.

In this case, in the optical disc drive apparatus 100 having the plurality of optical heads, in order to read out only a data group in the leading portion at a high speed and transmit it to the host computer 200, a method of allocating an amount obtained by dividing the data group by the number of the optical heads has been described with reference to FIG. 7 or 8. For example, in the case of four optical heads, an amount which is to be read out may be simply equivalent to dividing it by four, but in a case where four optical heads start the readout not simultaneously but sequentially, it is preferable that a large amount is allocated to an optical head capable of starting the readout earlier, and a small amount is allocated to the optical heads capable of starting the readout later. As this control is performed, it is possible to reduce the readout process time in the leading portion.

Figure 9:
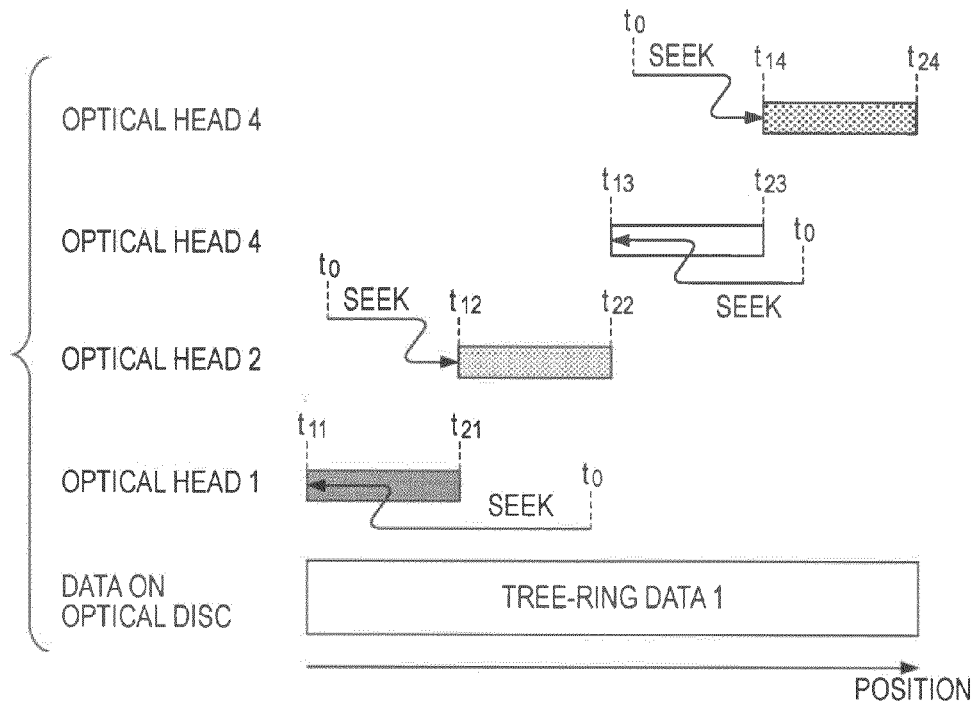
FIG. 9 is a diagram illustrating an optical disc readout control using a plurality of optical heads, in an optical disc drive apparatus according to the embodiment of the present invention.

Firstly, the optical disc readout control using the plurality of optical heads in the optical disc drive apparatus according to the embodiment of the present invention will be described. FIG. 9 is a diagram illustrating an optical disc readout control using the plurality of optical heads, in the optical disc drive apparatus according to the embodiment of the present invention will be described.

In FIG. 9, the optical head 1 performs a seek operation from a current position at a time t0, and moves to the leading data position of the tree-ring data 1 at a time t11. Further, the optical head 1 starts the readout of the tree-ring data 1 from the leading data position of the tree-ring data 1 at the time t11, and moves to a ¼ data position from the leading data position of the tree-ring data 1 at a time t21, to thereby complete the readout of the data from the leading data position to the ¼ data position of the tree-ring data 1.

The optical head 2 performs a seek operation from the current position at the time t0, and moves to the ¼ data position from the leading data position of the tree-ring data 1 at a time t12. Further, the optical head 2 starts the readout of the tree-ring data 1 from the ¼ data position after the leading data position of the tree-ring data 1 at a time t12, and moves to a ²⁄₄ data position from the leading data position of the tree-ring data 1 at a time t22, to thereby complete the readout of the data from the ¼ data position to the ²⁄₄ data position of the tree-ring data 1.

The optical head 3 performs a seek operation from the current position at the time t0, and moves to the ²⁄₄ data position from the leading data position of the tree-ring data 1 at a time t13. Further, the optical head 3 starts the readout of the tree-ring data 1 from the ²⁄₄ data position after the leading data position of the tree-ring data 1 at the time t13, and moves to a ¾ data position from the leading data position of the tree-ring data 1 at a time t23, to thereby complete the readout of the data from the ²⁄₄ data position to the ¾ data position of the tree-ring data 1.

The optical head 4 performs a seek operation from the current position at the time t0, and moves to the ¾ data position from the leading data position of the tree-ring data 1 at a time t14. Further, the optical head 4 starts the readout of the tree-ring data 1 from the ¾ data position after the leading data position of the tree-ring data 1 at the time t14, and moves to a trailing data position of the tree-ring data 1 at a time t24, to thereby complete the readout of the data from the ¾ data position to the trailing data position of the tree-ring data 1.

Figure 10:
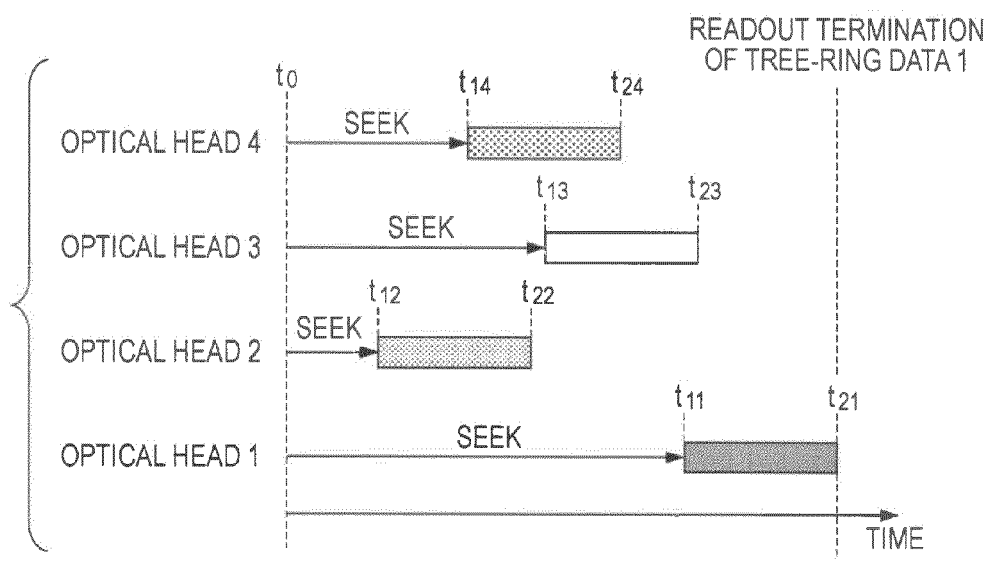
FIG. 10 is a diagram illustrating the relationship between time and a seek operation and a data readout of each optical head, in an optical disc readout control in FIG. 9.

FIG. 10 is a diagram illustrating the relationship between time and the seek operation and data readout of each optical head, in the optical disc readout control shown in FIG. 9.

As shown in FIG. 10, in the optical disc readout control shown in FIG. 9, according to the distance between each optical head and a readout start position which is a target before the readout starts, the seek time up to the target position is different, thereby causing a difference in time until the readout can start.

That is, in a case where the readout start time of each optical head is not uniform, if the readout amount of each optical head is equal, as shown in FIG. 10, the waiting time until a data group necessary for reproduction is completely read out is the time until the optical head which started the readout last completes the readout of the allocated amount.

In the optical disc readout control using the plurality of optical heads, in the optical disc drive apparatus according to the second embodiment of the present invention, the readout amount of the data allocated to each optical head is adjusted and controlled so that the completion times of the data readout by the respective optical heads are simultaneous or approximately simultaneous. Hereinafter, detailed description thereof will be described.

Figure 11:
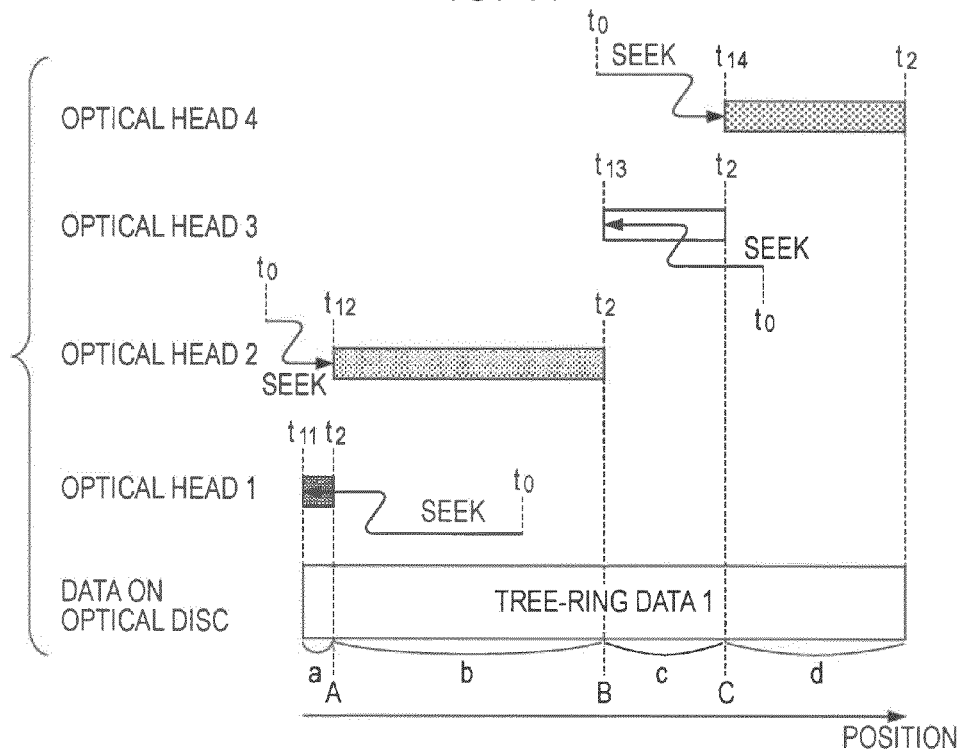
FIG. 11 is a diagram illustrating an optical disc readout control using a plurality of optical heads, in an optical disc drive apparatus according to a second embodiment of the present invention.

FIG. 11 is a diagram illustrating an optical disc readout control using the plurality of optical heads, in the optical disc drive apparatus according to the second embodiment of the present invention.

In FIG. 11, the optical head 1 performs a seek operation from a current position at a time t0, and moves to the leading data position of the tree-ring data 1 at a time t11. Further, the optical head 1 starts the readout of the tree-ring data 1 from the leading data position of the tree-ring data 1 at the time t11, and moves from the leading data position to a data position A which is a data amount a of the tree-ring data 1 at a time t2, to thereby complete the data readout of the data amount a from the leading data position of the tree-ring data 1.

The optical head 2 performs a seek operation from a current position at the time t0, and moves to above-described the data position A of the tree-ring data 1 at a time t12. Further, the optical head 2 starts the readout of the tree-ring data 1 from the data position A of the tree-ring data 1 at the time t12, and moves from the data position A to a data position B which is a data amount b of the tree-ring data 1 at the time t2, to thereby complete the data readout from the data position A to the data position B of the tree-ring data 1.

The optical head 3 performs a seek operation from a current position at the time t0, and moves to the data position B of the tree-ring data 1 at a time t13. Further, the optical head 3 starts the readout of the tree-ring data 1 from the data position B of the tree-ring data 1 at the time t13, and moves from the data position B to a data position C which is a data amount c of the tree-ring data 1 at the time t2, to thereby complete the data readout from the data position B to the data position C of the tree-ring data 1.

The optical head 4 performs a seek operation from a current position at the time t0, and moves to the above-described data position C of the tree-ring data 1 at a time t14. Further, the optical head 4 starts the readout of the tree-ring data 1 from the data position C of the tree-ring data 1 at the time t14, and moves from the data position C to a trailing data position of the tree-ring data 1 at the time t2, to thereby complete the readout from the data position C of the trailing data position of the tree-ring data 1.

Figure 12:
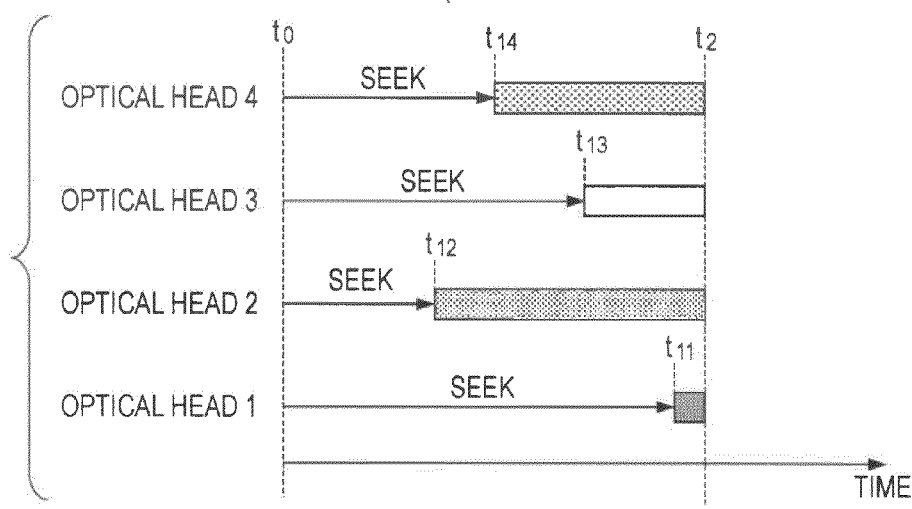
FIG. 12 is a diagram illustrating the relationship between time and a seek operation and a data readout of each optical head, in an optical disc readout control in FIG. 11.

FIG. 12 is a diagram illustrating the relationship between time and the seek operation and the data readout of each optical head, in the optical disc readout control shown in FIG. 11.

As shown in FIG. 12, in the optical disc readout control shown in FIG. 11, since the readout start time of each optical head is predicted and the readout amount is allocated of each optical head, the completion times of the readout by the respective optical heads are simultaneous or approximately simultaneous, and the waiting time until the data group necessary for reproduction is completed is minimized.

As described above, the readout amount of each optical head is allocated in consideration of the seek time up to the target readout start position of each optical head in advance, and thus, it is possible to shorten the total time until the data group which is a target is completely read using all of the optical heads.

In a case where the number of the optical heads is large, the optical head positioned in a place which is distant from the tree-ring data to be read out is not necessarily involved in the division of the readout. That is, in a case where the seek time up to the position of the tree-ring data which is the readout target is excessively long, the readout of the leading tree-ring data may be completed by using only the remaining optical heads during the seek time.

[Readout Mode Setting Process]

Hereinafter, a readout mode setting process performed by the optical disc drive apparatus shown in FIG. 1 will be described.

The optical disc drive apparatus 100 desirably performs the allocation to the optical heads in a mode of either "audio effect output" or "readout without spaces" in regard to the readout command from the above-described host computer 200, to thereby perform the readout, which will be determined as follows.

Firstly, in the case of a system which gives an instruction such as an addition of a mode setting option to each readout command from the host computer 200 or the like, the optical disc drive apparatus 100 may follow the instruction. The host computer 200 designates an optimal mode according to the process situation. That is, for example, in the case of the so-called "audio effect output" where the image head is immediately read out, division into small units is designated, and for example, in the case of "readout without spaces" in the file copy where one file is continuously read out at a high speed, division into large units is designated.

However, in a system in which the linkage between the host computer 200 and the optical disc drive apparatus 100 is relatively loose, such a mode instruction may not performed from the host computer 200. In this case, the optical disc drive apparatus 100 may perform a rough prediction and an operation based on the prediction.

That is, generally, there is a high possibility that a first readout command transmitted from the host computer 200 after power supply, a first readout command transmitted therefrom after a writing command, a readout command transmitted therefrom after a pause of a certain time, or a readout command for a non-continuous address is the leading portion of a clip (file). On the other hand, there is a high possibility that the continuously transmitted readout command is a mid portion (other than the leading portion) of the clip (file).

On the basis of this tendency, it is determined which division is performed for the readout. This will be described hereinafter.

Since there is a possibility that the reproduction is performed from the leading portion of the clip (file) with respect to the first readout command transmitted after power supply, in order to transmit data in the leading portion of the clip (file) to the host computer 200 at the highest possible speed, the readout division in the plurality of optical heads is performed in small units.

Since there is a possibility that the reproduction is performed from the leading portion of a new clip (file) with respect to the readout command after the writing command, in order to transmit data in the leading portion of the clip (file) to the host computer 200 at the highest possible speed, the readout division in the plurality of optical heads is performed in small units.

Since there is a possibility that the reproduction is performed from the leading portion of a new clip (file) with respect to the readout command after a pause of a certain time, in order to transmit data in the leading portion of the clip (file) to the host computer 200 at the highest possible speed, the readout division in the plurality of optical heads is performed in small units.

In the present embodiment, as described above, the optical disc drive apparatus 100 includes the timer 138 which measures elapsing of time after the last readout command was issued. The timer 138 is reset by the issuing of the readout command from the host computer 200 and starts counting from zero. Further, after a predetermined time has elapsed, the timer 138 stops the counting and outputs a flag signal indicating that the predetermined time has elapsed. The above-described condition is determined according to the presence or absence of the flag.

When the readout command for designating the non-continuous region is received from the host computer 200, since there is a high possibility that the reproduction is performed from the leading portion of a new clip (file), in order to transmit data in the leading portion of the clip (file) to the host computer 200 at the highest possible speed, the readout division in the plurality of optical heads is performed in small units.

After a certain amount of data is read out after the readout is started without satisfying the above condition, since there is a high possibility that the reproduction is performed for data after the beginning of the clip (file), in order to read out data of the entire clip (file) at the highest possible speed, the readout division in the plurality of optical heads is performed in large units.

A switching time in the controls between the division in small units and the division in large units is considered as follows. For example, in a case where first initial tree-ring data is two-seconds of image data and audio data, if second tree-ring data subsequent thereto can be completely read out by one optical head within two seconds, only the first tree-ring data is divided in small units to be read out, and the second tree-ring data and after is divided in large units to be read out.

In general, since one optical head moves at a speed equal to or faster than a playback speed, that is, a speed where equivalent reproduction of the image data and the audio data is possible, for example, the readout of the image data and the audio data of the two-second amount from the optical disc 102 is completed in a time shorter than two seconds, and thus, the above condition is necessarily established.

Hereinafter, specifically, the readout mode setting process performed by the optical disc drive apparatus in FIG. 1 will be described. FIG. 13 is a flowchart illustrating the readout mode setting process performed by the optical disc drive apparatus in FIG. 1. In this process, the above-described readout control in FIG. 8 or 11 is referred to as the leading region speed reading mode.

In FIG. 13, firstly, the CPU 134 of the optical disc drive apparatus 100 receives a readout command from the host computer 200 through the host I/F 136 (step S102).

Then, the CPU 134 determines whether the operation mode of the readout control of the optical head is designated (step S104).

If it is determined in step S104 that the operation mode is designated (YES in step S104), the CPU 134 determines whether a "reading without spaces" mode is designated (step S106).

If it is determined in step S106 that the "reading without spaces" mode is designated (YES in step S106), the CPU 134 sets the operation mode of the readout control of the optical head into the "reading without spaces" mode (step S116).

If it is determined in step S106 that the "reading without spaces" mode is not designated (NO in step S106), since this is the leading region speed reading mode, the CPU 134 sets the operation mode of the readout control of the optical head into the leading region speed reading mode (step S118).

That is, in the case of a system which gives an instruction such as an addition of a mode setting option to each readout command from the host computer 200 or the like, the CPU 134 of the optical disc drive apparatus 100 may follow the instruction. The host computer 200 designates an optimal operation mode according to the process situation. That is, for example, in the case of the so-called "audio effect output" where the image head is immediately read out, division in small units is designated, and for example, in the case of the "readout without spaces" in the file copy where one file is continuously read out at a high speed, division in large units is designated.

If it is determined in step S104 that the operation mode is not designated (NO in step S104), the CPU 134 determines whether the readout command is a first readout command after reset (step S108).

If it is determined in step S108 that it is the first readout command after reset (YES in step S108), the procedure goes to the process of the above-described step S118.

If it is determined in step S108 that it is not the first readout command after reset (NO in step S108), the CPU 134 determines whether the readout command is a first command after a writing command (step S110).

If it is determined in step S110 that it is the first readout command after the writing command (YES in step S110), the procedure goes to the process of the above-described step S118.

If it is determined in step S110 that it is not the first readout command after the writing command (NO in step S110), the CPU 134 determines whether the immediately previous readout command and address are non-continuous (step S112).

If it is determined in step S112 that the immediately previous readout command and address are non-continuous (YES in step S112), the procedure goes to the process of the above-described step S118.

If it is determined in step S112 that the immediately previous readout command and address are not non-continuous (NO in step S112), the CPU 134 determines whether a predetermined time has elapsed since the immediately previous readout command (step S114).

If it is determined in step S114 that the predetermined time has elapsed since the immediately previous readout command (YES in step S114), the procedure goes to the process of the above-described step S118.

If it is determined in step S114 that the predetermined time has not elapsed since the immediately previous readout command (NO in step S114), the procedure goes to the process of the above-described step S116.

In the process of step S116, the operation mode of the readout control of the optical head is set to the "reading without spaces" mode, and in the process of step S118, the operation mode of the readout control of the optical head is set to the leading region speed reading mode, and the present process ends.

According to the readout mode setting process in FIG. 13, when reading out data recorded on the optical disc, it is possible to appropriately control the plurality of optical heads.

According to the present embodiment, in the optical disc drive system 1000 having the optical disc drive apparatus 100 including the plurality of optical heads, in a case where the image reproduction is to be performed as quickly as possible, and in a case where data of a clip (file) or an entire optical disc is to be "read out without spaces" at a higher speed, the optical disc drive apparatus 100 dynamically switches the readout control, which makes it possible to improve the readout performance of the optical disc.

Further, according to the present embodiment, in the optical disc drive apparatus 100, even in a system configuration in which information is not received from the host computer 200, the optical disc drive apparatus 100 can perform prediction by itself, and can perform dynamic switching into an optimal readout mode.

Further, the object of the embodiment of the present invention can also be achieved by a storage medium which stores a program code of software for realizing the functions of each embodiment as described above being supplied to the system or the apparatus, and a computer (or CPU, MPU or the like) of the system or the apparatus performing readout of the program code stored in the storage medium.

In this case, the program code which is itself read out from the storage medium realizes the functions of each embodiment as described above, the program code and the storage medium which stores the program code constitutes the embodiment of the present invention.

Further, for example, a floppy (registered trademark) disc, a hard disc, a magneto-optical disc, an optical disc such as CD-ROM, CD-R, CD-RW, DVD-ROM, DVD-RAM, DVD- RW, or DVD+RW, a magnetic tape, a non-volatile memory card, ROM or the like may be used as the storage medium for supplying the program code. Alternatively, the program code may be downloaded through a network.

Further, as the computer executes the read-out program code, the functions of each embodiment as described above are realized and an OS (operating system) operated in the computer performs some or all of the practical processes according to instructions in the program code, the functions of each embodiment as described above may be realized according to this process.

Further, after the program code which is read out from the storage medium is written in a memory provided in a function extension board mounted in the computer or a function extension unit connected to the computer, a CPU or the like provided with the extended function in the extension board or the extension unit may perform some or all of practical processes according to the instructions of the program code, and the functions of the above-described embodiments may be realized by this process.

The present application contains subject matter related to that disclosed in Japanese Priority Patent Application JP 2009-267243 filed in the Japan Patent Office on Nov. 25, 2009, the entire contents of which are hereby incorporated by reference.

Hereinbefore, the preferred embodiments of the present invention are described with reference to the accompanying drawings, but the present invention is not limited to the embodiments. Those skilled in the art to which the present invention pertains would obviously understand that a variety of modifications or alterations are possible within the scope of technical ideas disclosed in claims, which is included in the technical scope of the present invention.

What is claimed is:

1. An optical disc drive apparatus comprising:
a plurality of optical heads which reads out data recorded on an optical disc; and
a control section which respectively controls a readout operation and a seek operation for the data of the plurality of optical heads,
wherein the control section includes
a first mode in which when reading out a data group for reproduction of images or audio which are recorded on the optical disc, a readout amount of the data group is allocated to each of the plurality of optical heads and the readout operations of the plurality of optical heads are respectively controlled; and
a second mode in which when reading out the data group for reproduction of the images or audio which are recorded on the optical disc, the readout operations of the plurality of optical heads are respectively controlled so that each optical head reads out the data group, and
wherein the control section is able to dynamically switch the first mode and the second mode.

2. The apparatus according to claim 1,
wherein the control section performs control in the first mode when reading out a data group for reproduction of leading images or audio in one file, and performs control in the second mode when reading out a data group, which is recorded on the optical disc, for reproduction of images or audio subsequent to the leading images or audio in one file.

3. The apparatus according to claim 1 or 2,
wherein the control section allocates the readout amount equally to each of the plurality of optical heads.

4. The apparatus according to claim 1 or 2,
wherein the control section allocates a different readout amount to each of the plurality of optical heads so that the plurality of optical heads terminates the readout at the same time on the basis of information about current positions of each optical head and information about time taken for the seek operation of each optical head.

5. The apparatus according to any one of claims 1 to 4,
wherein the control section selectively determines an optical head to which the readout amount is allocated among the plurality of optical heads on the basis of information about current positions of each optical head and information about time taken for the seek operation of each optical head.

6. A control method of an optical disc drive apparatus having a plurality of optical heads which reads out data recorded on an optical disc and a control section which respectively controls a readout operation and a seek operation for the data of the plurality of optical heads, the method comprising the steps of:
allocating, when reading out a data group for reproduction of leading images or audio in one file which are recorded on the optical disc, a readout amount of the data group to each of the plurality of optical heads, and respectively controlling the readout operations of the plurality of optical heads; and
respectively controlling, when reading out a data group, which is recorded on the optical disc, for reproduction of images or audio subsequent to the leading images or audio in one file, the readout operations of the plurality of optical heads so that each optical head reads out the data group.

7. An optical disc drive system comprising:
an optical disc drive apparatus including a plurality of optical heads which reads out data recorded on an optical disc, and a control section which respectively controls a readout operation and a seek operation for the data of the plurality of optical heads, wherein the control section includes a first mode in which when reading out a data group for reproduction of images or audio which are recorded on the optical disc, a readout amount of the data group is allocated to each of the plurality of optical heads and the readout operations of the plurality of optical heads are respectively controlled, and a second mode in which when reading out the data group for reproduction of the images or audio which are recorded on the optical disc, the readout operations of the plurality of optical heads are respectively controlled so that each optical head reads out the data group, and wherein the control section is able to dynamically switch the first mode and the second mode; and
a host computer which issues a readout command to the control section of the optical disc drive apparatus.

* * * * *